US010721740B2

(12) United States Patent
Liu et al.

(10) Patent No.: US 10,721,740 B2
(45) Date of Patent: Jul. 21, 2020

(54) METHOD, APPARATUS, AND COMPUTER STORAGE MEDIUM FOR THE TRANSMISSION OF MESSAGES DURING RANDOM ACCESS

(71) Applicant: ZTE CORPORATION, Guangdong (CN)

(72) Inventors: Kun Liu, Guangdong (CN); Bo Dai, Guangdong (CN); Zhaohua Lu, Guangdong (CN); Shuqiang Xia, Guangdong (CN); Xianming Chen, Guangdong (CN); Huiying Fang, Guangdong (CN); Jing Shi, Guangdong (CN); Wen Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/067,546

(22) PCT Filed: Dec. 7, 2016

(86) PCT No.: PCT/CN2016/108922
§ 371 (c)(1),
(2) Date: Jun. 29, 2018

(87) PCT Pub. No.: WO2017/121212
PCT Pub. Date: Jul. 20, 2017

(65) Prior Publication Data
US 2019/0014571 A1 Jan. 10, 2019

(30) Foreign Application Priority Data

Jan. 11, 2016 (CN) .......................... 2016 1 0016812

(51) Int. Cl.
*H04W 4/00* (2018.01)
*H04W 72/04* (2009.01)
(Continued)

(52) U.S. Cl.
CPC ......... *H04W 72/048* (2013.01); *H04W 74/08* (2013.01); *H04W 74/0833* (2013.01); *H04W 74/0866* (2013.01); *H04W 88/023* (2013.01)

(58) Field of Classification Search
CPC ........... H04W 72/048; H04W 74/0866; H04W 74/0833; H04W 88/023; H04W 74/08
(Continued)

(56) References Cited

U.S. PATENT DOCUMENTS 10,091,816 B2 * 10/2018 Zhao .................... H04W 56/004
2011/0194510 A1 * 8/2011 Gaal ...................... H04L 5/0037
370/329
(Continued)

FOREIGN PATENT DOCUMENTS

CN 102006633 A 4/2011
CN 102447546 A 5/2012
(Continued)

OTHER PUBLICATIONS

Extended European Search Report dated Jan. 3, 2019, in corresponding European Patent Application No. 16884764.8.
(Continued)

*Primary Examiner* — Chuong T Ho
(74) *Attorney, Agent, or Firm* — Duane Morris LLP

(57) ABSTRACT

The present embodiments provide a method for the transmission of messages during random access, comprising: terminals that transmit type-1 messages to the base station according to the type-1 message transmission method corresponding to the terminal set to which the terminal belongs; wherein, the terminal sets are classified according to the subcarrier transmission capability supported by the terminals. The present embodiments also provide three other
(Continued)

methods for the transmission of messages during random access, as well as the corresponding devices and computer storage mediums.

8 Claims, 1 Drawing Sheet

(51) Int. Cl.
*H04W 74/08* (2009.01)
*H04W 88/02* (2009.01)

(58) Field of Classification Search
USPC .................................................. 370/329, 330
See application file for complete search history.

(56) References Cited

U.S. PATENT DOCUMENTS

| | | | |
|---|---|---|---|
| 2013/0294363 A1 | 11/2013 | Feng et al. | |
| 2015/0365976 A1 | 12/2015 | Lee et al. | |
| 2016/0100431 A1* | 4/2016 | Kishiyama | H04W 4/70 370/252 |
| 2016/0278124 A1* | 9/2016 | Zhao | H04W 56/004 |
| 2019/0097853 A1* | 3/2019 | Suzuki | H04L 27/2634 |

FOREIGN PATENT DOCUMENTS

| | | |
|---|---|---|
| CN | 102523626 A | 6/2012 |
| CN | 104488346 A | 4/2015 |
| WO | 2015042866 A1 | 4/2015 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP Standard; 3GPP TS 36.321, 3RD Generation Partnership Project (3GPP), Mobile Competence Centre ; 650, Route Des Lucioles ; F-06921 Sophia-Antipolis Cedex ; France, vol. RAN WG2, No. V12.4.0, Dec. 31, 2014 (Dec. 31, 2014), pp. 1-60 XP050927382.

MediaTek Inc. "NB-IOT—UE Capability and Configuration" 3GPP TSG RAN WG2 NB-IOT Ad-hoc Meeting, Budapest, Hungary, Jan. 19th-21st, 2016, R2-160507, pp. 1-3, XP051066492.

ZTE "Remaining issues on PRACH for NB-IoT" 3GPP TSG RAN WG1 Meeting #84bis, Busan, Korea, Apr. 11th-15th, 2016, R1-162764, pp. 1-4, XP051080701.

International Search Report dated Feb. 21, 2017, in corresponding International Application No. PCT/CN2016/108922.

Search Report dated Sep. 17, 2019 in priority application CN 201610016812.4.

* cited by examiner

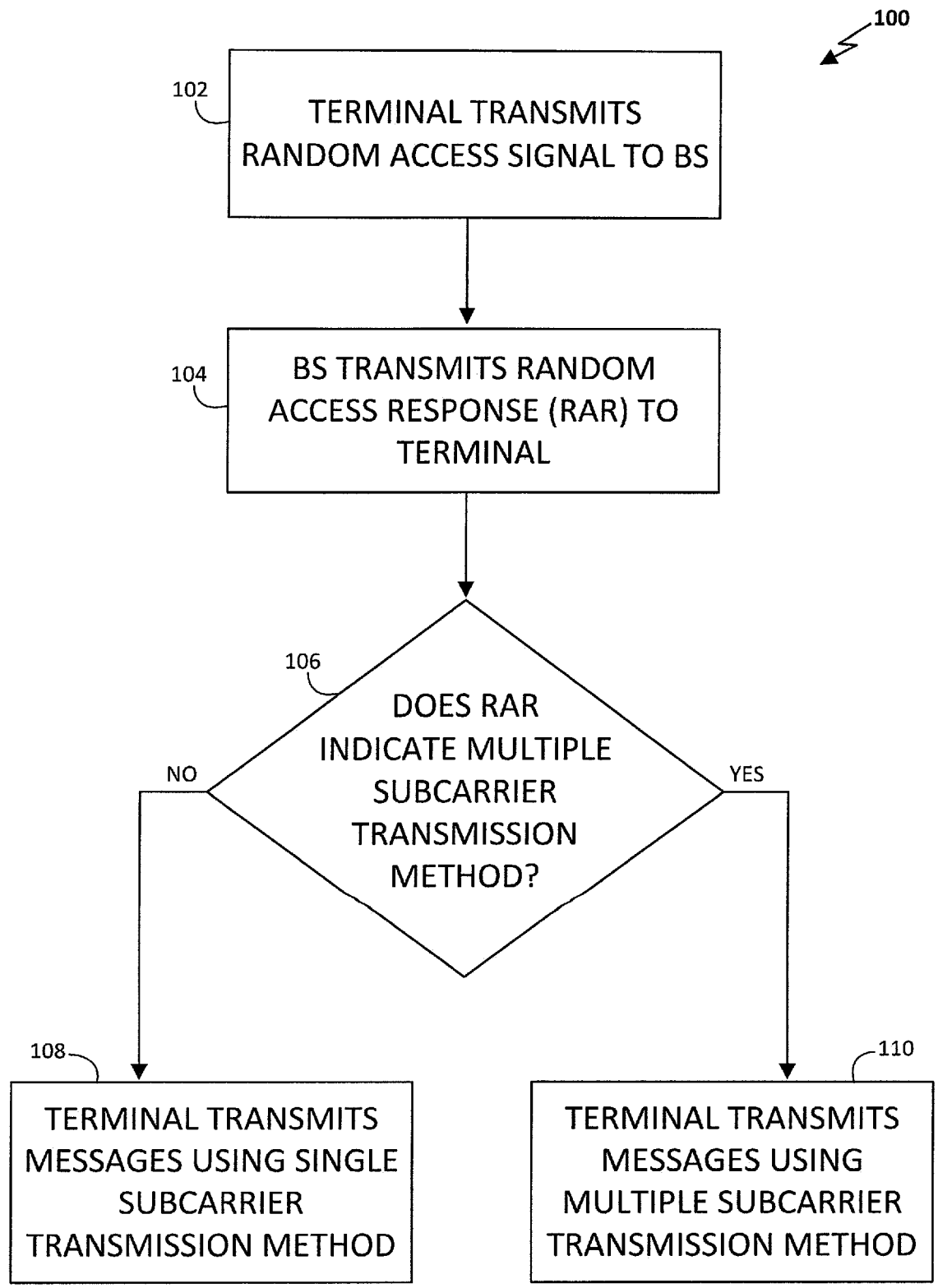

METHOD, APPARATUS, AND COMPUTER STORAGE MEDIUM FOR THE TRANSMISSION OF MESSAGES DURING RANDOM ACCESS

TECHNICAL FIELD

The present invention is related to the field of Communications; specifically, it involves a method, apparatus, and computer storage medium for the transmission of messages during random access.

BACKGROUND TECHNIQUES

Machine Type Communication (MTC) User Equipment (UE), hereafter referred to as MTC UE (also known as Machine to Machine (M2M) User Equipment) is currently the primary application mode for the Internet of Things. Its low power consumption and low cost are important factors that ensure its large-scale application.

Currently, the primary methods for MTC UE cost reduction include reducing the terminal's receiving antenna, reducing the terminal's baseband processing bandwidth, reducing the peak rate supported by the terminal, or using the half duplex mode, etc. In baseband processing bandwidth for MTC UE, for example, there will exist terminals that can only support single subcarrier baseband processing, and terminals that can support multiple subcarrier baseband processing. How to let the base station know the MTC UE's capabilities when the MTC UE accesses the system is thus an important problem to solve.

CONTENTS OF THE PRESENT EMBODIMENTS

In order to solve the problem of random access interference that exists within present technologies, the present embodiments provide a method, apparatus, and computer storage medium for the transmission of messages during random access. The technical solutions of the present embodiments are implemented as follows:

The present embodiments provide a method for the transmission of messages during random access, comprising:

the terminal transmits type-1 messages to the base station according to the type-1 transmission method that corresponds to the terminal set to which the terminal belongs wherein, the terminal set is determined by the subcarrier transmission capability supported by the terminal.

In the above method, the first terminal set comprises terminals that support the simultaneous transmission of multiple subcarriers, and the second terminal set comprises terminals that do not support the simultaneous transmission of multiple subcarriers.

In the above method, the type-1 transmission method comprises the transmission of type-1 messages and/or the transmission of resources used by type-1 messages.

In the above method, type-1 messages comprise one of the following: contention-based random access messages; Message 3 (Msg3) and non-contention-based random access messages.

In the above method, when type-1 messages are contention-based random access messages or non-contention-based random access messages, the random access resources used by type-1 messages comprise at least one of the following:

time domain resources of the random access channel;

frequency domain resources of the random access channel;

random access sequences transmitted on the random access channel.

In the above method, when type-1 messages are non-contention-based random access messages, and the terminal belongs to the first terminal set, the terminal obtains the type-1 transmission method by receiving type-2 messages transmitted by the base station.

In the above method, type-2 messages are trigger messages for random access messages with non-competitive mechanisms, wherein, the transmission method for non-contention-based random access messages signaled by the trigger message is multiple subcarrier transmission or single subcarrier transmission.

In the above method, type-2 messages are a trigger message for random access messages with non-competitive mechanisms, wherein, when the transmission method for non-contention-based random access messages corresponding to the trigger message is multiple subcarrier transmission, the transmission format is different from the transmission format used when the transmission method for non-contention-based random access messages corresponding to the trigger message is single subcarrier transmission.

The above method, wherein the difference between the two transmission formats comprises:

when the transmission method for non-contention-based random access messages corresponding to the trigger message is multiple subcarrier transmission, the size of the information carried is different from the size of the information carried using single subcarrier transmission.

In the above method, type-2 messages are the resource indication information for non-contention-based random access messages.

In the above method, when type-2 messages are the resource indication information for non-contention-based random access messages, terminals obtain the type-1 transmission method through receiving type-2 messages transmitted by the base station, which comprises:

when the resource indication information of the random access message of noncompetitive mechanisms indicates that 1 subcarrier is allocated in the frequency domain, the terminal determines that the transmission method for the random access message of the noncompetitive mechanism is single subcarrier transmission;

when the resource indication information of the random access message of noncompetitive mechanisms indicates that multiple subcarriers are allocated in the frequency domain, the terminal determines that the transmission method for the random access message of the noncompetitive mechanism is multiple subcarrier transmission.

In the above method, when the type-1 message is Msg3 and the terminal belongs to the first terminal set, the terminal obtains the Msg3 transmission method through receiving type-2 messages transmitted by the base station, wherein, the Msg 3 transmission method uses single subcarrier transmission or multiple subcarrier transmission.

Alternatively, in the above method, type-2 messages are random access response messages or system information sent from the base station to the terminal.

In the above method, when the terminal belongs to the first terminal set, the method further comprises:

terminals transmitting type-1 messages according to the type-1 transmission method corresponding to the subset of the first terminal set;

wherein, the first terminal set is divided into N subsets according to the ranking information of the terminals; different subsets comprise terminals of different ranks, wherein, N is a positive integer greater than 1.

In the above method, the type-1 transmission method corresponding to the subsets of the first terminal set comprises:

the first subset in the first terminal set comprises: the highest ranked $N_1$ terminals within the N subsets; the type-1 message transmission method corresponding to the first subset is single subcarrier transmission, wherein, $N_1$ is a a positive integer greater than or equal to 1 and lesser than or equal to N.

In the above method, when the subcarrier interval has multiple configurations, subcarrier intervals of type-1 messages are determined according to the terminal rankings.

In the above method, when the subcarrier interval has 2 configurations, configure a small subcarrier interval for the highest ranked $K_1$ terminals within the first subset to transmit type-1 messages to transmit type-1 messages, and configure a large subcarrier interval for the remaining $N_1-K_1$ ranked terminals to transmit type-1 messages, wherein, $K_1$ is a positive integer greater than or equal to 1 and lesser than or equal to N.

In the above method, when the subcarrier interval has multiple configurations, the terminal obtains the subcarrier interval for type-1 messages through receiving type-2 messages transmitted by the base station.

In the above method, when type-1 messages are Msg3, type-2 messages are random access response messages;

when type-1 messages are random access messages based on competitive mechanisms, type-2 messages are system information;

when type-1 messages are non-contention-based random access messages, type-2 messages are trigger messages for non-contention-based random access messages.

In the above method, the type-1 message transmission method corresponding to the subsets of the first terminal set comprises:

the second subset of the first terminal set comprises $N_2$ ranked terminals other than $N_1$ ranked terminals; the type-1 transmission method corresponding to the second subset is multiple subcarrier transmission, wherein, $N_2$ is a positive integer, and $N_2=N-N_1$.

In the above method, when the transmission method for type-1 messages corresponding to the second subset is single subcarrier transmission and the subcarrier interval has multiple configurations, determine the subcarrier interval of type-1 message transmission according to the terminal rankings.

In above method, when the subcarrier interval has 2 configurations, configure a small subcarrier interval for the highest ranked $K_2$ terminals within the second subset to transmit type-1 messages, and configure a large subcarrier interval for remaining $N_2-K_2$ ranked terminals within the second subset to transmit type-1 messages, wherein $K_2$ is a positive integer greater than or equal to 1 and lesser than or equal to N.

In the above method, when the subcarrier interval has multiple configurations, terminals within the second subset obtain the subcarrier interval for type-1 messages through receiving type-2 messages transmitted by the base station.

In the above method, when type-1 messages are Msg3, type-2 messages are random access response messages;

when type-1 messages are random access messages based on competitive mechanisms, type-2 messages are system messages;

when type-1 messages are non-contention-based random access messages, type-2 messages are trigger messages for non-contention-based random access messages.

In the above method, the terminal ranking information comprises at least one of the following:

coverage enhancement rank;

physical channel repeat transmission rank;

repeat transmission of signaling or messages carried on the physical channel rank.

When the terminal belongs to the first terminal set, the above method further comprises:

terminals transmitting type-1 messages to the base station according to the type-1 transmission method corresponding to the subset within the first terminal set;

wherein, the subsets of the first terminal set are classified into 2 subsets according to the size of the transport block used by the terminal to transmit the type-1 message; the terminals comprising the first subset use large transport blocks to transmit type-1 messages, and the terminals comprising the second subset use small transport blocks to transmit type-1 messages.

In the above method, type-1 messages comprise Msg3.

In the above method, the type-1 message transmission method corresponding to the first subset is multiple subcarrier transmission;

the type-1 message transmission method corresponding to the second subset is single subcarrier transmission.

In the above method, when the transmission method for type-1 messages is single subcarrier transmission and the single subcarrier interval has multiple configurations, determine the subcarrier interval of type-1 messages according to the terminal rankings within the second subset.

In the above method, when the transmission method for type-1 messages is single subcarrier transmission and the single subcarrier interval has 2 configurations, configure a small subcarrier interval for the highest ranked M1 terminals within the second subset for the transmission of type-1 messages, and configure a large subcarrier interval for remaining $M-M_1$ ranked terminals within the second subset for transmission of type-1 messages, wherein, M is the number of rankings configured by the base station or the number of rankings within the second subset, and $M_1$ is a positive integer greater than or equal to 1 and lesser than M.

In the above method, when the transmission method for type-1 messages is single subcarrier transmission and the single subcarrier interval has multiple configurations, the terminal obtains the subcarrier interval for type-1 messages through receiving type-2 messages transmitted by the base station.

In the above method, type-2 messages are random access response messages.

The present embodiments also provide a method for the transmission of messages during random access, comprising:

terminals that support the simultaneous transmission of multiple subcarriers transmit type-1 messages to the base station according to the type-1 message transmission method corresponding to the terminal set to which the terminal belongs;

wherein, the terminal set is divided into N terminal sets according to the terminal ranking information; different terminal sets comprise differently ranked terminals, wherein N is a positive integer greater than 1.

In the above method, the type-1 message transmission method corresponding to the terminal set to which the terminal belongs comprises:

terminals divided into the first terminal set based on terminal ranking information; the first terminal set comprises the highest ranked $N_1$ terminals; the transmission method for type-1 messages corresponding to the first terminal set is single subcarrier transmission, wherein, $N_1$ is a positive integer greater than or equal to 1 and lesser than or equal to N.

In the above method, when the subcarrier interval has multiple configurations, determine the subcarrier interval of type-1 message transmissions based on the terminal rankings.

In the above method, when the subcarrier interval has 2 configurations, configure a small subcarrier interval for the highest ranked $K_1$ terminals within the first terminal set to transmit type-1 messages, and configure a large subcarrier interval for the remaining $N_1-K_1$ ranked terminals within the first terminal set to transmit type-1 messages, wherein, K is a positive integer greater than or equal to 1 and lesser than or equal to N.

In the above method, when the subcarrier interval has multiple configurations, the terminal obtains the subcarrier interval for type-1 messages through receiving type-2 messages transmitted by the base station.

In the above method, when type-1 messages are Msg3, type-2 messages are random access response messages;

when type-1 messages are random access messages based on competitive mechanisms, type-2 messages are system information;

when type-1 messages are non-contention-based random access messages, type-2 messages are trigger messages for the non-contention-based random access messages.

In the above method, the type-1 message transmission method corresponding to the terminal set to which the terminal belongs comprises:

terminals divided into the second terminal set based on terminal ranking information; the second terminal set comprises $N_2$ ranked terminals other than $N_1$ ranked terminals; the type-1 message transmission method corresponding to the second terminal set is multiple subcarrier transmission, wherein, $N_2$ is a positive integer, and $N_2=N-N_1$.

In the above method, the type-1 message transmission method corresponding to the terminal set to which the terminal belongs further comprises:

terminals divided into the second terminal set based on terminal ranking information; the second terminal set comprises $N_2$ ranked terminals other than $N_1$ ranked terminals; the type-1 message transmission method corresponding to the second terminal set is single subcarrier transmission or multiple subcarrier transmission, wherein, $N_2$ is a positive integer, and $N_2=N-N_1$.

In the above method, when the type-1 message transmission method corresponding to the second terminal set is single subcarrier transmission and the single subcarrier interval has multiple configurations, determine the subcarrier interval for type-1 messages based on the terminal rankings.

In the above method, when the subcarrier interval has 2 configurations, configure a small subcarrier interval for the highest ranked $K_2$ terminals within the second terminal set to transmit type-1 messages, and configure a large subcarrier interval for the remaining $N_2-K_2$ ranked intervals within the second terminal set to transmit type-1 messages, wherein, $K_2$ is a positive integer greater than or equal to 1 and lesser than or equal to N.

In the above method, when the subcarrier interval has multiple configurations, terminals within the second terminal set obtain the subcarrier interval of type-1 messages through receiving type-2 information sent by the base station.

In the above method, when type-1 messages are Msg3, type-2 messages are random access response messages;

when type-1 messages are random access messages based on competitive mechanisms, type-2 messages are system information;

when type-1 messages are non-contention-based random access messages, type 2 messages are trigger messages for non-contention-based random access messages.

In the above method, terminal ranking information comprises at least one of the following:

coverage enhancement rank;

physical channel repeat transmission rank;

repeat transmission of signaling or messages carried on the physical channel rank.

The above method further comprises:

terminal transmitting type-1 messages to the base station according to the type-1 message transmission method corresponding to the subset within the first terminal set;

wherein, every terminal set's subsets are classified into 2 subsets according to the size of the transport block used by the terminal to transmit the type-1 message; the terminals comprising the first subset use large transport blocks to transmit type-1 messages, and the terminals comprising the second subset use small transport blocks to transmit type-1 messages.

In the above method, the type-1 message transmission method corresponding to the first subset is multiple subcarrier transmission;

the type-1 message transmission method corresponding to the second subset is single subcarrier transmission;

In the above method, when the type-1 message transmission method is single subcarrier transmission and the single subcarrier interval has multiple configurations, determine the subcarrier interval of type-1 messages according to the terminal rankings within the second subset.

In the above method, when the type-1 message transmission method is single subcarrier transmission and the single subcarrier interval has 2 configurations, configure a small subcarrier interval for the highest ranked $M_1$ terminals within the second subset for the transmission of type-1 messages, and configure a large subcarrier interval for remaining $M-M_1$ terminals within the second subset for transmission of type-1 messages, wherein, M is the number of rankings configured by the base station or the number of rankings within the second subset, $M_1$ is a positive integer greater than or equal to 1 and lesser than M.

In the above method, when the type-1 message transmission method is single subcarrier transmission and the single subcarrier interval has multiple configurations, the terminal obtains the subcarrier interval of type-1 messages through receiving type-2 messages transmitted by the base station.

In the above method, type-2 messages are random access response messages.

The present embodiments also provide a method for the transmission of messages during random access, comprising:

terminals transmitting type-1 messages to the base station according to the type-1 message transmission method corresponding to the terminal set to which the terminal belongs;

wherein, the terminal set is divided into 2 subsets according to the size of the transport block used by the terminal to transmit the type-1 message; the terminals comprising the first subset use large transport blocks to transmit type-1 messages, and the terminals comprising the second subset use small transport blocks to transmit type-1 messages.

In the above method, the type-1 message transmission method corresponding to the first terminal set is multiple subcarrier transmission;

the type-1 message transmission method corresponding to the second terminal set is single subcarrier transmission;

In the above method, when the type-1 message transmission method is single subcarrier transmission and the single subcarrier interval has multiple configurations, determine the subcarrier interval of type-1 messages according to the terminal rankings within the second terminal set.

In the above method, when the type-1 message transmission method is single subcarrier transmission and the single subcarrier interval has 2 configurations, configure a small subcarrier interval for the highest ranked $M_1$ terminals within the second terminal set for the transmission of type-1 messages, and configure a large subcarrier interval for remaining $M-M_1$ ranked terminals within the second terminal for transmission of type-1 messages, wherein, M is the number of rankings configured by the base station or the number of rankings within the second subset, and M1 is a positive integer greater than or equal to 1 and lesser than M.

In the above method, when the type-1 message transmission method is single subcarrier transmission and the single subcarrier interval has multiple configurations, the terminal obtains the subcarrier interval of type-1 messages through receiving type-2 messages transmitted by the base station.

In the above method, type-2 messages are random access response messages.

The present embodiments also provide a method for the transmission of messages during random access, comprising:

terminals transmitting Msg3 to the base station according to the Msg3 transmission method corresponding to the random access message transmission method.

In the above method, the random access message transmission method comprises the transmission method of the random access message and the random access resource occupied by random access messages.

In the above method, the transmission method for random access messages comprises single subcarrier transmission or multiple subcarrier transmission.

In the above method, when the transmission method for random access messages is single subcarrier transmission, the corresponding Msg3 transmission method is single subcarrier transmission;

when the transmission method for random access messages is multiple subcarrier transmission, the corresponding Msg3 transmission method is multiple subcarrier transmission.

In the above method, when the transmission method for random access messages is single subcarrier transmission, the random access resource of the corresponding Msg3 transmission is different from the random access resource of the corresponding Msg3 transmission used when multiple subcarriers are transmitted.

In the above method, the Msg3 transmission method corresponding to the random access message transmission method comprises, dividing the terminals into two sets according to the random access resources occupied by random access messages, wherein, one set's corresponding Msg3 transmission method uses a single subcarrier, and the other set's corresponding Msg3 transmission method uses multiple subcarriers.

In the above method, the random access resource comprises at least one of the following:

time domain resources on the random access channel;

frequency domain resources on the random access channel;

random access sequences transmitted on the random access channel.

The present embodiments also provide an apparatus for the transmission of messages during random access, comprising:

the first transmission unit, configured to transmit type-1 messages to the base station according to the type-1 message transmission method corresponding to the terminal set to which the terminal belongs;

wherein, the terminal set is classified according to the subcarrier transmission capability of the terminals, The apparatus further comprises:

The first determination unit, configured to determine the terminal set to which the terminal belongs.

The present embodiments also provide an apparatus for the transmission of messaging during random access, comprising:

the second transmission unit, configured to transmit type-1 messages to the base station according to the type-1 message transmission method corresponding to the terminal set to which the terminal belongs; the terminal supports the simultaneous transmission of multiple subcarriers;

wherein, the terminal set is divided into N terminal sets according to the terminal ranking information; different terminal sets comprise terminals of different ranks, wherein N is a positive integer greater than 1.

The apparatus further comprises:

the second determination unit, configured to determine the terminal set to which the terminal belongs.

The present embodiments also provide an apparatus for the transmission of messages during random access, comprising:

the third transmission unit, configured to transmit type-1 messages to the base station according to the type-1 message transmission method corresponding to the terminal set to which the terminal belongs;

wherein, the terminal set is divided into 2 subsets according to the size of the transport block used by the terminal to transmit the type-1 message; the terminals comprising the first subset use large transport blocks to transmit type-1 messages, and the terminals comprising the second subset use small transport blocks to transmit type-1 messages.

The apparatus further comprises: the third determination unit, configured to determine the terminal set to which the terminal belongs.

The present embodiments also provide an apparatus for the transmission of messages during random access, comprising:

the fourth transmission unit, configured to transmit Msg3 to the base station according to the Msg3 transmission method corresponding to the random access message transmission method.

The apparatus further comprises: the fourth determination unit, configured to determine the Msg3 transmission method corresponding to the random access message transmission method.

The present embodiments also provide a computer storage medium comprising a set of instructions which, when executed, cause at least one processor to execute the message transmission methods during random access outlined above.

The implementation of the technical solutions provided by the present embodiments more effectively resolves the problem of random access interference, especially regarding the random access process for MTC UE.

BRIEF DESCRIPTION OF THE DRAWINGS

FIG. 1 illustrates a flow chart of a method of wireless communications between a terminal and a base station, in accordance with some embodiments of the invention.

DETAILED DESCRIPTION

In order for the technical solutions and advantages of the present embodiments to become more apparent, this document will hereinafter describe specific examples of the present embodiments in detail. It should be noted that the embodiments of the present invention and the features thereof can be combined in a non-conflicting manner.

Embodiment 1

In order to support uplink synchronization on the wireless system, terminals must transmit random access signaling (also called Message 1 (Msg1)) on the Physical Random Access Channel (PRACH), wherein the radio system can be configured for many kinds of transmission formats for random access signaling (also called preamble format); the base station will choose the configuration information for a preamble format and send it to the UE. After the UE obtains the Preamble format supported by the present system, it will randomly select a sequence from the set of random access sequences configured by the base station, and will generate a random access signal (Msg1) according to the preamble format. The terminal will transmit Msg1 on the PRACH, as shown in step 102 of FIG. 1.

Once the base station detects the random access signal sent by the terminal on the PRACH, the base station will transmit a random access response (RAR; also known as Message2 (Msg2)) to the terminal, as shown in step 104 of FIG. 1.

The terminal receives the RAR, and obtains the uplink timing synchronization information and the uplink resource; but at this time it is not possible to determine whether the base station is transmitting the RAR to the terminal itself or to other terminals because it is possible that different terminals will transmit the same random access resource on the same time-frequency resource (this situation is called random access interference); because of this, the terminal must transmit Msg3 on the uplink resource allocated in the RAR to resolve the random access interference. Msg3 is the first message transmitted that is based on uplink scheduling and that uses the hybrid automatic repeat request (HARQ) mechanism. During initial random access, Msg3 will carry a specific terminal ID used to distinguish between different terminals.

Msg3 can support the transmission of a single subcarrier or multiple subcarriers; it can also divide random access resources (time frequency resources and/or random access sequence sets occupied by the random access channel) into terminal sets. For example, terminals that transmit Msg3 on multiple subcarriers select a set of random access resources to transmit random access signaling; terminals that transmit Msg3 on single subcarriers choose a different set of random access resources to transmit random access signaling.

After the base station receives the Msg3 transmitted by the terminal, the base station transmits a Message 4 (Msg4) to resolve this kind of random access conflict, wherein the Msg4 will carry the terminal's designation ID transmitted by the Msg3. If the terminal receives the Msg4 transmitted by the base station and the designation ID therein matches its own designation ID previously reported to the base station via Msg3, the terminal decides that it has won this random access interference, and the random access is successful; otherwise, the terminal decides that this round of access is a failure, and repeats the random access procedure. Additionally, the higher the coverage enhancement rank of the terminal, the higher the coverage enhancement requirements will be, and the more times there will be repeat transmissions on the physical channel; therefore, the terminals can be classified into sets of varying rank according to terminal strength, and different message transmission methods can be configured.

In this way, the present embodiments provide a method for message transmission during random access, primarily involving the following operations:

the terminal can transmit type-1 messages to the terminal according to the type-1 message transmission method corresponding to the terminal set to which the terminal belongs.

wherein, the terminal set can be classified based on the terminal's capability to support subcarrier transmission; for example, first terminal sets comprising terminals that can support the simultaneous transmission of multiple subcarriers, and second terminal sets comprising terminals that do not support the simultaneous transmission of multiple subcarriers.

wherein, the type-1 message transmission method comprises the type-1 message transmission method and/or transmission of resources used by type-1 messages. Within the present embodiment, the type-1 message transmission methods comprise single subcarrier transmission and multiple subcarrier transmission.

Type-1 messages comprise contention-based random access messages, as well as Msg3 and non-contention-based random access messages.

For example, when it is a random access message with competitive or noncompetitive messages, the random access resources typically used by type-1 messages comprise at least one of the following:

time domain resources on the random access channel;

frequency domain resources on the random access channel;

random access sequences transmitted on the random access channel.

It should be noted that because terminals within the first terminal set support the simultaneous transmission of multiple subcarriers, there must be a further determination as to whether to use the single subcarrier transmission method or the multiple subcarrier transmission method when transmitting type-1 messages.

The following are examples of which type of transmission method the terminal will use for different type-1 messages.

For example, for terminals within the first terminal set, if the type-1 message that needs to be transmitted is a random access message of noncompetitive mechanisms, the terminal obtains the type-1 message through receiving the type-2 message sent by the base station, and can either adopt the single subcarrier transmission method, or the multiple subcarrier transmission method. Wherein, type-2 message can be trigger messages or resource signaling information for non-contention-based random access messages.

When type-2 messages are trigger messages for non-contention-based random access messages, the transmission method can be directly/indirectly indicated by the trigger message.

For example, the information carried within the trigger message can indicate that the random access message transmission method is multiple subcarrier transmission or single subcarrier transmission. It is also possible to indicate the transmission method from the different transmission formats of trigger messages, that is, when the trigger message uses a certain type of transmission format, there is a corresponding indication that the transmission method for non-contention-based random access messages is multiple subcarrier transmission, as shown in step 106 of FIG. 1. If the trigger messages uses a different format, there is a corresponding indication that the transmission method for non-contention-based random access messages is single subcarrier transmission.

Or, when the transmission method for non-contention-based random access messages corresponding to the trigger indication is multiple subcarrier transmission, the size of the information carried is different from the size of the information carried during single subcarrier transmission.

When type-2 messages are the resource indication information of non-contention-based random access messages, the specific signaling can use the following method (the following description is only an example, and does not serve to limit the present embodiments):

when the resource indication information of the random access message of noncompetitive mechanism indicates that 1 subcarrier is allocated in the frequency domain, the terminal determines that the transmission method for non-contention-based random access messages is single subcarrier transmission, as shown in step 108 of FIG. 1;

when the resource indication information of the random access message of noncompetitive mechanisms indicates that multiple subcarriers are allocated in the frequency domain, the terminal determines that the transmission method for non-contention-based random access messages is multiple subcarrier transmission, as shown in step 110 of FIG. 1.

The following uses the example of when type-1 messages are Msg3 to explain how terminals in the first terminal set determine the transmission method. For example, the base station issues type-2 messages to alert the terminal of the Msg3 transmission method, wherein, the Msg3 transmission method uses single subcarrier transmission or multiple subcarrier transmission.

At this time, type-2 messages are random access response messages or system information sent from the base station to the terminal.

Important to note is that after terminals are classified according to the principles outlined above, the terminals that belong to the first terminal set support the simultaneous transmission of multiple subcarriers; it is thus that the first set of terminals can be further classified into subsets based on whether the terminal uses the single subcarrier transmission method or the multiple subcarrier transmission method.

This classification can be made according to the terminal rankings or the size of the transport block used during message transmission.

First, the scheme for creating subsets based on the terminal's ranking is explained.

The terminal transmits type-1 messages to the base station according to the type-1 message transmission method that corresponds to the subset of the first terminal set;

wherein, the subsets of the first terminal set are classified into N subsets according to the ranking information of the terminal; different subsets comprise terminals of different ranks, wherein N is a positive integer greater than 1.

For example, the first subset in the first terminal set comprises the highest ranked $N_1$ terminals within the N subsets; the type-1 message transmission method corresponding to the first subset is single subcarrier transmission, wherein, $N_1$ is a positive integer greater than or equal to 1 and lesser than or equal to N.

The second subset of the first terminal set comprises $N_2$ ranked terminals other than $N_1$ ranked terminals; the type-1 message transmission method corresponding to the second subset is multiple subcarrier transmission, wherein, $N_2$ is a positive integer, and $N_2=N-N_1$.

For a terminal within the first subset, if the subcarrier interval has multiple configurations, determine the subcarrier interval of type-1 messages according to the terminal rankings.

when the subcarrier interval has 2 configurations, configure a small subcarrier interval for terminals with the highest $K_1$ ranks within the first subset to transmit type-1 messages, and configure a large subcarrier interval for remaining $N_1-K_1$ rank terminals within the first subset to transmit type-1 messages, wherein $K_1$ is a positive integer greater than or equal to 1 and lesser than or equal to N.

When the subcarrier interval has multiple configurations, the base station can transmit type-2 messages to signal to the terminal the subcarrier interval of type-1 messages;

when the type-1 message is Msg3, type-2 messages are random access response messages;

when type-1 messages are random access messages based on competitive mechanisms, type-2 messages are system information;

when type-1 messages are non-contention-based random access messages, type-2 messages are trigger messages for non-contention-based random access messages.

For terminals in the second subset, when the type-1 message transmission method is single subcarrier transmission and the subcarrier interval has multiple configurations, the subcarrier interval of type-1 message transmission can be determined according to the terminal rankings.

When the subcarrier interval has 2 configurations, configure a small subcarrier interval for the highest ranked $K_2$ terminals within the second subset to transmit type-1 messages, and configure a large subcarrier interval for the remaining $N_2-K_2$ rank terminals within the second subset to transmit type-1 messages, wherein, $K_2$ is a positive integer greater than or equal to 1 and lesser than N.

When the subcarrier interval has multiple configurations, terminals in the second subset obtain the subcarrier interval for type-1 messages from receiving type-2 messages transmitted by the base station.

Wherein, when type-1 messages are Msg3, type-2 messages are random access response messages;

when type-1 messages are random access messages based on competitive mechanisms, type-2 messages are system messages;

when type-1 messages are non-contention-based random access messages, type-2 messages are trigger messages for random access messages of non-competitive mechanisms.

Specifically, the terminal ranking information comprises at least one of the following:

coverage enhancement rank;

physical channel repeat transmission rank;

repeat transmission of signaling or messages carried on the physical channel rank.

Important to note is that when classifying terminal subsets according to ranking information, the rank's range can be used to determine the classification, that is, terminals that belong to the same ranking range belong to the same terminal subset, and terminals in different subsets belong to different ranking ranges. The specific number of subsets is related to the number of ranking ranges; that is, the ranks are divided according to ranking strength into several ranges, which in turn are several subsets. For the corresponding configuration of the specific transmission method within each subset, one can refer to the configuration of the N subsets outlined above; it will not be described further here.

The following describes a scheme for creating subsets based on the transport block size used during message transmission. Terminals transmit type-1 messages to the base station according to the type-1 message transmission method corresponding to the subset of the first terminal set (to which the terminal belongs). Terminals transmit type-1 messages to the base station according to the type-1 message transmission method corresponding to the subset of the first terminal set (to which the terminal belongs); wherein, the subsets of the first terminal set are classified into 2 subsets according to the transport block size used by the terminal to transmit type-1 messages; the terminals comprising the first subset use large transport blocks to transmit type-1 messages, and the terminals comprising the second subset use small transport blocks to transmit type-1 messages; wherein, the type-1 message transmission method corresponding to the first subset is multiple subcarrier transmission, and the type-1 message transmission method corresponding to the second subset is single subcarrier transmission;

With this method for classification, type-1 messages typically comprise Msg3.

For terminals belonging to the second subset, another method for transmitting type-1 messages is single subcarrier transmission; if, at this time, the single subcarrier interval has multiple configurations, the subcarrier interval of type-1 message transmission can be determined according to terminal rankings in the second subset.

If the single subcarrier interval has 2 configurations, a small subcarrier interval can be configured for the highest ranked $M_1$ terminals within the second subset for the transmission of type-1 messages, and a large subcarrier interval can be configured for the remaining $M-M_1$ ranked terminals within the second subset for the transmission of type-1 messages, wherein, M is the number of rankings configured by the base station or the number of rankings within the second subset, and $M_1$ is a positive integer greater than or equal to 1 and less than M.

If the subcarrier interval has multiple configurations, the terminal can obtain the subcarrier interval for type-1 messages from receiving type-2 messages transmitted by the base station. Specifically, type-2 messages could be random access response messages.

Embodiment 2

The present embodiment concerns terminals that can support the simultaneous transmission of multiple subcarriers, classifying terminal sets according to terminal rank, and determining terminal uplink transmission methods; these methods primarily comprise the following operations:

the terminals that support the simultaneous transmission of multiple subcarriers transmit type-1 messages to the base station according to the type-1 message transmission method corresponding to the terminal set to which the terminal belongs;

wherein, the terminal set is divided into N terminal sets according to the terminal ranking information; different terminal sets comprise terminals of different rank, wherein N is a positive integer greater than 1.

Specifically, terminals can be divided into the first terminal set based on terminal ranking information, wherein the first terminal set comprises the highest ranked $N_1$ terminals; the type-1 message transmission method corresponding to the first terminal set is single subcarrier transmission, wherein, $N_1$ is a positive integer greater than or equal to 1 and lesser than or equal to N.

Terminals are then divided into the second terminal set based on terminal ranking information; the second terminal set comprises $N_2$ ranked terminals other than $N_1$ ranked terminals; the type-1 message transmission method corresponding to the second terminal set is multiple subcarrier transmission, wherein, $N_2$ is a positive integer, and $N_2 = N - N_1$;

For each terminal within the first terminal set, when the subcarrier interval has multiple configurations, the subcarrier interval of the type-1 message transmission can be determined according to the terminal rankings.

When the subcarrier interval has 2 configurations, configure a small subcarrier interval for the highest ranked $K_1$ terminals within the first subset to transmit type-1 messages, and configure a large subcarrier interval for the remaining $N_1 - K_1$ ranked terminals within the first subset to transmit type-1 messages, wherein, $K_1$ is a positive integer greater than or equal to 1 and lesser than or equal to N.

When the subcarrier interval has multiple configurations, the base station can transmit type-2 messages to signal to the terminal a subcarrier interval for type-1 messages.

For example, when type-1 messages are Msg3, type-2 messages are random access response messages;

when type-1 messages are random access messages based on competitive mechanisms, type-2 messages are system messages;

when type-1 messages are random access messages based on noncompetitive mechanisms, type-2 messages are trigger messages for non-contention-based random access messages.

For terminals belonging to the second terminal set, if the type-1 message transmission method is single subcarrier transmission and the single subcarrier interval has multiple configurations, determine the subcarrier interval for type-1 message transmission according to terminal rankings.

When the subcarrier interval has 2 configurations, configure a small subcarrier interval for the highest ranked $K_2$ terminals within the second terminal set to transmit type-1 messages, and configure a large subcarrier interval for the remaining $N_2 - K_2$ ranked terminals within the second terminal set to transmit type-1 messages, wherein, $K_2$ is a positive integer greater than or equal to 1 and lesser than or equal to N.

When the subcarrier interval has multiple configurations, the base station can send a type-2 message to signal to the terminal for a subcarrier interval of type-1 messages.

For example, when the type-1 messages are Msg3 messages, type-2 messages are random access response messages;

when type-1 messages are random access messages based on competitive mechanisms, type-2 messages are system messages;

when type-1 messages are non-contention-based random access messages, type-2 messages are trigger messages for non-contention-based random access messages.

Terminal ranking information of the present embodiment comprises at least one of the following:

coverage enhancement rank;

physical channel repeat transmission rank;

repeat transmission of signaling or messages carried on the physical channel rank.

Important to note is that when classifying terminal subsets according to ranking information, the rank's range can be used to determine the classification, that is, terminals that belong to the same ranking range belong to the same terminal subset, and terminals in different subsets belong to different ranking ranges. The specific number of subsets is related to the number of ranking ranges; that is, the ranks are divided according to ranking strength into several ranges, which in turn are several subsets. For the corresponding configuration of the specific transmission method within each subset, one can refer to the configuration of the N subsets outlined above; it will not be described further here.

Within the present embodiment, and on the basis of the terminal sets outlined above, it is also possible to classify terminals based on the size of the transport block used for the type-1 message; that is, terminals transmit type-1 messages to the base station according to the type-1 message transmission method corresponding to the subset of the terminal set to which the terminal belongs;

wherein, every terminal set's subsets are classified into 2 subsets according to the size of the transport block used by the terminal to transmit the type-1 message; the terminals comprising the first subset use large transport blocks to transmit type-1 messages, and the terminals comprising the second subset use small transport blocks to transmit type-1 messages.

Specifically, the type-1 message transmission method corresponding to the first subset can be configured to multiple subcarrier transmission;

the type-1 message transmission method corresponding to the second subset can be configured to single subcarrier transmission;

When the type-1 message transmission method is single subcarrier transmission and the single subcarrier interval has multiple configurations, the subcarrier interval for type-1 message transmission can be determined from the terminal rankings within the second terminal subset.

When the type-1 message transmission method is single subcarrier transmission and the single subcarrier interval has 2 configurations, a small subcarrier interval can be configured for the highest ranked $M_1$ terminals within the second subset for the transmission of type-1 messages, and a large subcarrier interval can be configured for the remaining $M-M_1$ terminals within the second subset for transmission of type-1 messages, wherein, M is the number of rankings configured by the base station or the number of rankings within the second subset, and $M_1$ is a positive integer greater than or equal to 1 and lesser than M.

When the single subcarrier interval has multiple configurations, the terminal can obtain the subcarrier interval for type-1 messages from type-2 messages transmitted by the base station. Specifically, type-2 messages are random access response messages.

Embodiment 3

The present embodiment provides a scheme for classifying terminals based primarily on the transport block size of type-1 messages; this method comprises the following operations:

the terminal transmits type-1 messages to the base station according to the type-1 message transmission method corresponding to the terminal set to which the terminal belongs;

wherein, the terminal set is divided into 2 subsets according to the size of the transport block used by the terminal to transmit the type-1 message; the terminals comprising the first subset use large transport blocks to transmit type-1 messages, and the terminals comprising the second subset use small transport blocks to transmit type-1 messages.

Specifically, the relationship configured between the first terminal set and its corresponding type-1 message transmission method is multiple subcarrier transmission the type-1 message transmission method corresponding to the second terminal set is single subcarrier transmission.

Wherein, if terminals within the second terminal set have a single subcarrier interval with multiple configurations, the terminal interval for type-1 message transmission is determined according to terminal rankings.

Supposing that the single subcarrier interval has 2 configurations, a small subcarrier interval can be configured for the highest ranked $M_1$ terminals within the second subset for the transmission of type-1 messages, and a large subcarrier interval can be configured for the remaining $M-M_1$ ranked terminals within the second subset for transmission of type-1 messages, wherein, M is the number of rankings configured by the base station or the number of rankings within the second subset, and $M_1$ is a positive integer greater than or equal to 1 and lesser than M.

Besides the methods outlined above, it is also possible for the base station to instruct the terminal to transmit the subcarrier interval for type-1 messages, that is, when the single subcarrier interval has multiple configurations, the terminal obtains the single subcarrier interval for type-1 messages through receiving type-2 messages transmitted by the base station. Type-2 messages can be random access response messages.

Embodiment 4

The present embodiment provides a method for the transmission of messages during random access that is primarily aimed at the process of transmitting Msg3 on the UE end; this method comprises:

the terminal transmits Msg3 to the base station according to the Msg3 transmission method corresponding to the transmission method for random access messages.

Within the present embodiment, the transmission method for random access messages comprises the transmission method for random access messages and the random access resource occupied by random access messages.

The transmission method for random access messages comprises single subcarrier transmission or multiple subcarrier transmission.

Within the present embodiment, the preferred configuration of correspondence between the transmission method of random access messages and the Msg3 transmission method comprises the following situations:

Situation 1:

when the transmission method for random access messages is single subcarrier transmission, the corresponding Msg3 transmission method is single subcarrier transmission;

when the transmission method for random access messages is multiple subcarrier transmission, the corresponding Msg3 transmission method is multiple subcarrier transmission.

Situation 2:

when the transmission method for random access messages is single subcarrier transmission, the corresponding Msg3 transmission random access resource is the first random access resource;

when the transmission method for random access messages is multiple subcarrier transmission, the corresponding Msg3 transmission random access resource is a random access resource.

The first random access resource and the random access resource are different resources.

In addition, there is also a scheme for determining the Msg3 transmission method, that is, dividing the terminals into two sets according to the random access resources occupied by random access messages, and configuring the corresponding Msg3 transmission method for one set to use single subcarriers, and the corresponding Msg3 transmission method for the other set to use multiple subcarriers.

Embodiment 5

The present embodiment provides an apparatus for the transmission of messages during random access; this apparatus can implement the scheme outlined in Embodiment 1, and primarily comprises:

the first transmission unit, configured to transmit type-1 messages to the base station according to the type-1 message transmission method corresponding to the terminal set to which the terminal belongs;

wherein, the terminal set is classified according to the subcarrier transmission capability supported by the terminals; the first terminal set comprises terminals that support the simultaneous transmission of multiple subcarriers, and the second terminal set comprises terminals that do not support the simultaneous transmission of multiple subcarriers.

The apparatus can further comprise: the first determination unit, configured to determine the terminal set to which the terminal belongs.

In addition, the apparatus can further comprise: the first grouping unit, configured primarily to divide terminals into sets and to configure the corresponding type-1 message transmission methods for different terminal sets.

Because the apparatus of the present embodiment can implement the program outlined in Embodiment 1, other detailed explanations of the present apparatus can be found in the corresponding content of Embodiment 1, and will not be explained further here.

Important to note is the first transmission unit can be implemented with a transceiver device within the random access message transmission device; the first determination unit and the first grouping unit can be implemented with a processor within the random access message transmission device.

Embodiment 6

The present embodiment provides an apparatus for the transmission of messages during random access; this apparatus can implement the scheme outlined in Embodiment 2, and primarily comprises:

the second transmission unit, configured to transmit type-1 messages to the base station according to the type-1 message transmission method corresponding to the terminal set to which the terminal belongs; the terminals of the apparatus support the simultaneous transmission of multiple subcarriers;

wherein, terminal sets are divided into N terminal sets according to the ranking information of the terminals, and different terminal sets comprise terminals of different ranks, wherein N is a positive integer greater than 1.

The apparatus can further comprise: the second determination unit, configured to determine the terminal set to which the terminal belongs.

In addition, the apparatus can further comprise: the second grouping unit, configured primarily to divide terminals into sets and to configure the corresponding type-1 message transmission methods for different terminal sets.

Because the apparatus of the present embodiment can implement the program outlined in Embodiment 2, other detailed explanations of the present apparatus can be found in the corresponding content of Embodiment 2, and will not be explained further here.

Important to note is the second transmission unit can be implemented with a transceiver device within the random access message transmission device; the second determination unit and the second grouping unit can be implemented with a processor within the random access message transmission device.

Embodiment 7

The present embodiment provides an apparatus for the transmission of messages during random access; this apparatus can implement the scheme outlined in Embodiment 3, and primarily comprises:

the third transmission unit, configured to transmit type-1 messages to the base station according to the type-1 message transmission method corresponding to the terminal set to which the terminal belongs;

wherein, the terminal set is divided into 2 subsets according to the transport block size used by the terminal in the transmission of type-1 messages; the terminals comprising the first terminal set use large transport blocks to transmit type-1 messages, and the terminals comprising the second terminal set use small transport blocks to transmit type-1 messages.

The apparatus can further include: the third determination unit, configured to determine the terminal set to which the terminal belongs.

In addition, the apparatus can further comprise the third grouping unit, configured primarily to divide terminals into sets and to configure the corresponding type-1 message transmission methods for different terminal sets.

Because the apparatus of the present embodiment can implement the program outlined in Embodiment 3, other detailed explanations of the present apparatus can be found in the corresponding content of Embodiment 3, and will not be explained further here.

Important to note is the third transmission unit can be implemented with a transceiver device within the random access message transmission device; the third determination unit and the third grouping unit can be implemented with a processor within the random access message transmission device.

Embodiment 8

The present embodiment provides an apparatus for the transmission of messages during random access; this apparatus can implement the scheme outlined in Embodiment 4, and primarily comprises:

the fourth transmission unit, configured to transmit Msg3 according to the Msg3 transmission method corresponding to the transmission method for random access messages;

The apparatus can further comprise: the fourth determination unit, configured to determine the terminal set to which the terminal belongs.

In addition, the apparatus can further comprise the fourth grouping unit, configured primarily to divide terminals into sets and to configure the corresponding type-1 message transmission methods for different terminal sets.

Because the apparatus of the present embodiment can implement the program outlined in Embodiment 4, other detailed explanations of the present apparatus can be found in the corresponding content of Embodiment 4, and will not be explained further here.

Important to note is the third transmission unit can be implemented with a transceiver device within the random access message transmission device; the third determination unit and the third grouping unit can be implemented with a processor within the random access message transmission device.

It will be apparent to those of ordinary skill in the related art that all of or a portion of the steps outlined above can be implemented using a program that instructs the related hardware; this program can be stored on a computer-readable storage medium such as ROM, disks, or CDs. Alternatively, all of or a portion of the steps outlined in the above embodiments can be implemented using one or more integrated circuits. Appropriately, each module/unit of the above embodiments can be implemented using hardware, or can be implemented with software functional modules. This application is not limited to any particular combination of hardware or software.

It will be apparent to those skilled in the related art that the present embodiments may provide a method, a system, or a computer storage medium. Therefore, the present invention might take the form of a hardware embodiment, a software embodiment, or a combination of software and hardware aspects. Moreover, the present invention could take the form of a computer storage product implemented in one or more computer usable storage mediums (including, but not limited to, disk storage, optical memory, etc.) comprising computer-usable program codes.

Based on this, the embodiments of the present invention provide a computer storage medium comprising a set of instructions that, when implemented, cause at least one processor to execute a transmission method for messages during random access that has been outlined in the present embodiments.

The embodiments outlined herein are intended to be the preferred embodiments of the present invention, and do not serve to limit its scope. Any modifications, equivalent substitutions, improvements, etc., within the spirit or principles of the present embodiments should be included within the scope of the present invention.

INDUSTRIAL APPLICABILITY

Within the present embodiments, when terminals transmit type-1 messages to the base station, they do so according to the transmission method of type-1 messages that corresponds to the terminal set to which the terminal belongs; wherein, the terminal set is determined by a scheme provided by the present embodiments that classifies terminals based on their subcarrier transmission capability, and which better solves the problem of random access interference, especially for the random access of MTC UE.

The invention claimed is:

1. A method performed by a wireless communication device, comprising:
   receiving a first message from a wireless communication node, wherein the first message indicates one of a multiple subcarrier transmission method and a single subcarrier transmission method; and
   transmitting a Message 3 (Msg3) message to the wireless communication node in accordance with whether the wireless communication device belongs to a first terminal set or a second terminal set, wherein the first terminal set is associated with a first repeat transmission rank indicative of a first number times to repeat transmission of a physical channel signal, and the second terminal set is associated with a second repeat transmission rank indicative of a second number of times to repeat transmission of the physical channel signal different from the first number of times;
   wherein when the first message indicates the single subcarrier transmission method and when the wireless communication device belongs to the first terminal set, sending the Msg3 message to the wireless communication node using a single subcarrier transmission; and
   when the first message indicates the multiple subcarrier transmission method and when the wireless communication device belongs to the second terminal set, sending the Msg3 message to the wireless communication node using a multiple subcarrier transmission.

2. The method of claim 1, wherein
   the first message further indicates one of a plurality of subcarrier intervals used for transmitting the Msg3 message.

3. A method of receiving messages, comprising:
   transmitting a first message to a wireless communication device, wherein the first message indicates one of a multiple subcarrier transmission method and a single subcarrier transmission method; and
   receiving a Message 3 (Msg3) message from the wireless communication device in accordance with whether the wireless communication device belongs to a first terminal set or a second terminal set, wherein the first terminal set is associated with a first repeat transmission rank indicative of a first number times to repeat transmission of a physical channel signal, and the second terminal set is associated with a second repeat transmission rank indicative of a second number of times to repeat transmission of the physical channel signal different from the first number of times;
   wherein when the first message indicates the single subcarrier transmission method and when the wireless communication device belongs to the first terminal set, receiving the Msg3 message from the wireless communication device in a single subcarrier transmission; and
   when the first message indicates the multiple subcarrier transmission method and when the wireless communication device belongs to the second terminal set, receiving the Msg3 message from the wireless communication device in a multiple subcarrier transmission.

4. The method of claim 3, wherein
   the first message further indicates one of a plurality of subcarrier intervals used for transmitting the Msg3 message.

5. A non-transitory computer-readable medium having stored thereon computer-executable instructions for carrying out a method in accordance with any one of claims 1 through 4.

6. A method of receiving messages, comprising:
transmitting a first message to a wireless communication device, wherein the first message indicates one of a multiple subcarrier transmission method and a single subcarrier transmission method; and
receiving a Message 3 (Msg3) message from the wireless communication device in accordance with whether the wireless communication device is associated with a first number times to repeat transmission of a physical channel signal or the wireless communication device is associated with a second number of times to repeat transmission of the physical channel signal, wherein the second number of times is different from the first number of times, wherein when the wireless communication device is associated with the first number of times to repeat transmission of the physical channel signal, receiving the Msg3 message from the wireless communication device in a single subcarrier transmission, and when the wireless communication device is associated with the second number of times to repeat transmission of the physical channel signal, receiving the Msg3 message from the wireless communication device in a multiple subcarrier transmission.

7. The method of claim 6, wherein the first message further indicates one of a plurality of subcarrier intervals used for transmitting the Msg3 message.

8. A non-transitory computer-readable medium having stored thereon computer-executable instructions for carrying out a method in accordance with claim 6.

* * * * *